Nov. 10, 1959 — O. W. DAWSON — 2,911,770
FIXTURE FOR POSITIONING TOOL RELATIVE TO GRINDING HEAD
Filed March 22, 1955 — 4 Sheets-Sheet 1
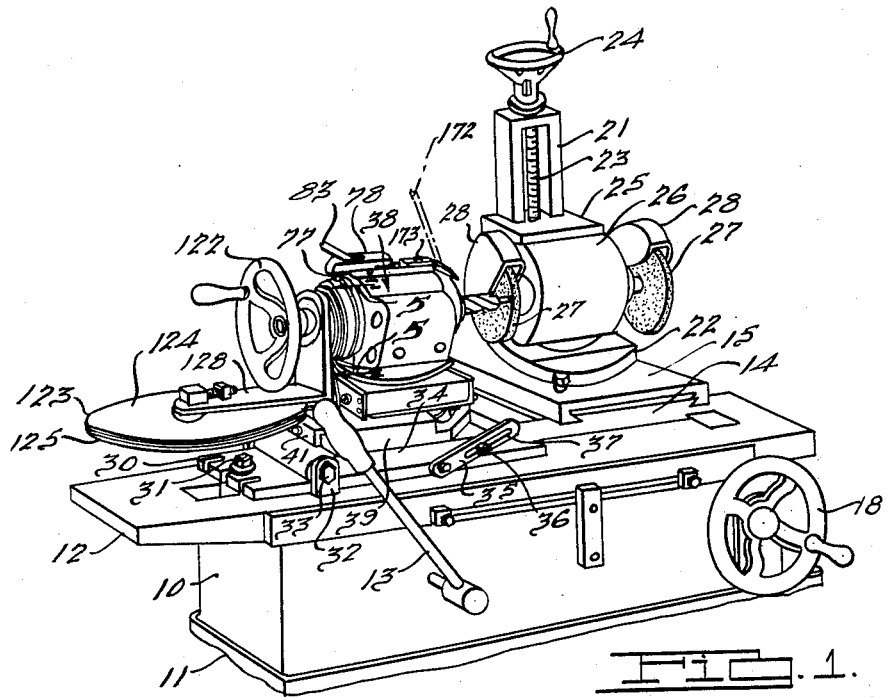
FIG. 1.
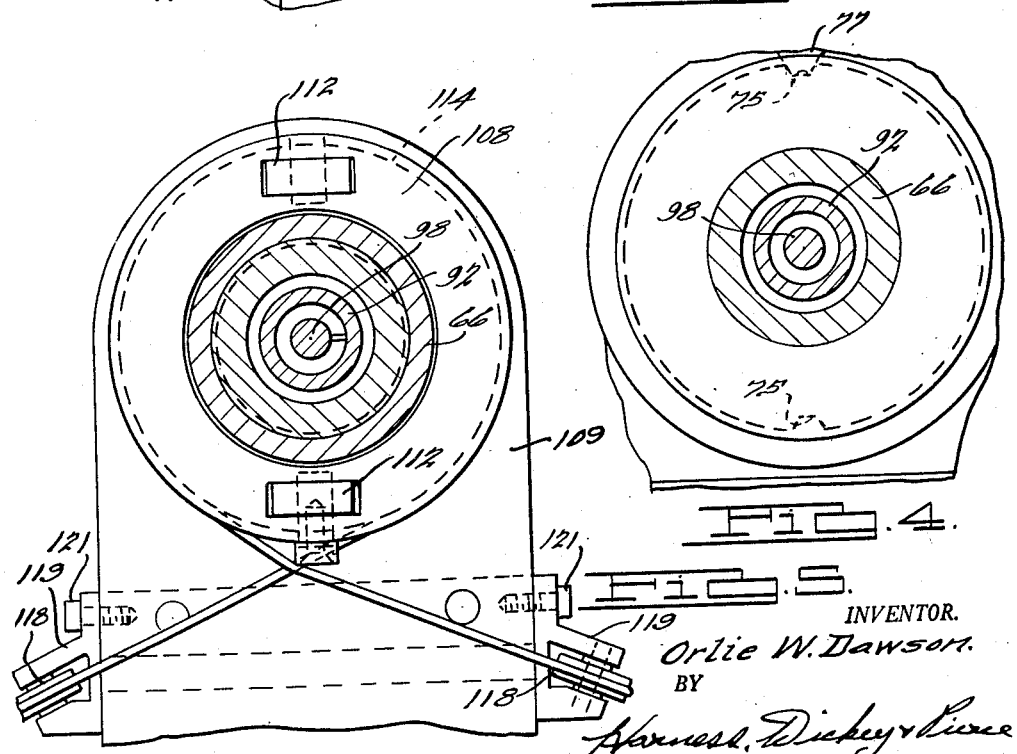
FIG. 4.
FIG. 5.
INVENTOR.
Orlie W. Dawson.
BY
Harness, Dickey & Pierce
ATTORNEYS.

Nov. 10, 1959     O. W. DAWSON     2,911,770
FIXTURE FOR POSITIONING TOOL RELATIVE TO GRINDING HEAD
Filed March 22, 1955     4 Sheets-Sheet 2
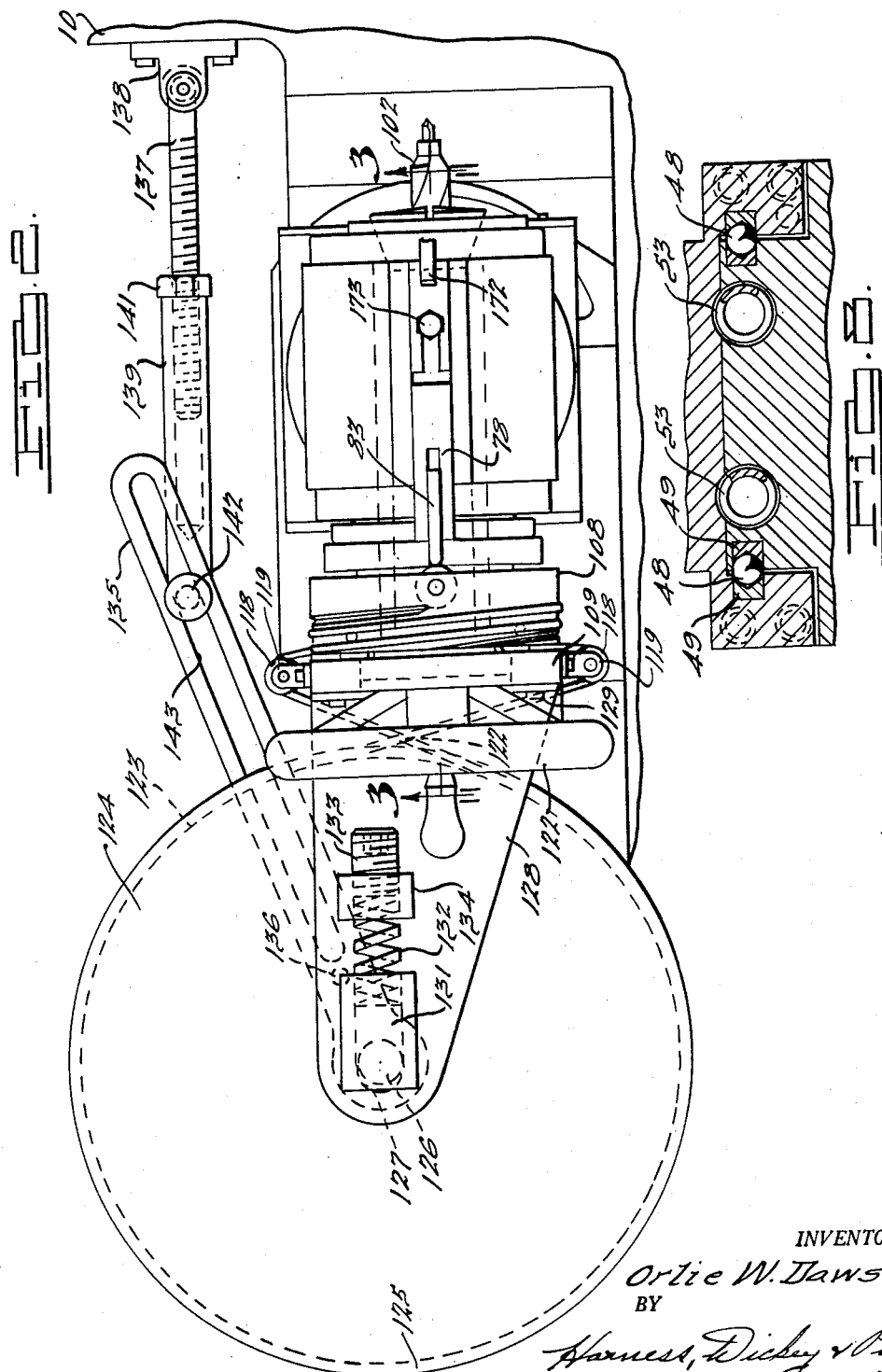
INVENTOR.
Orlie W. Dawson.
BY
Harness, Dickey & Pierce
ATTORNEYS.

Nov. 10, 1959  O. W. DAWSON  2,911,770
FIXTURE FOR POSITIONING TOOL RELATIVE TO GRINDING HEAD
Filed March 22, 1955  4 Sheets-Sheet 3
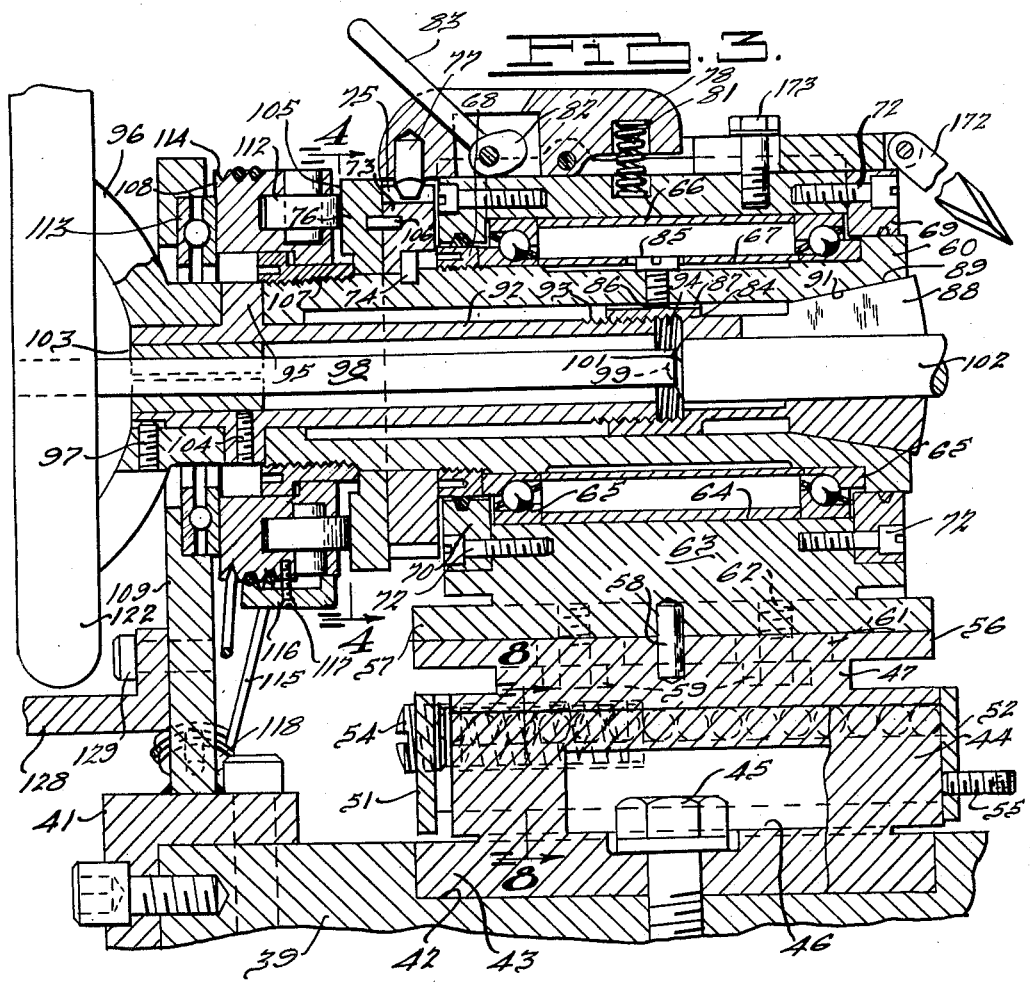
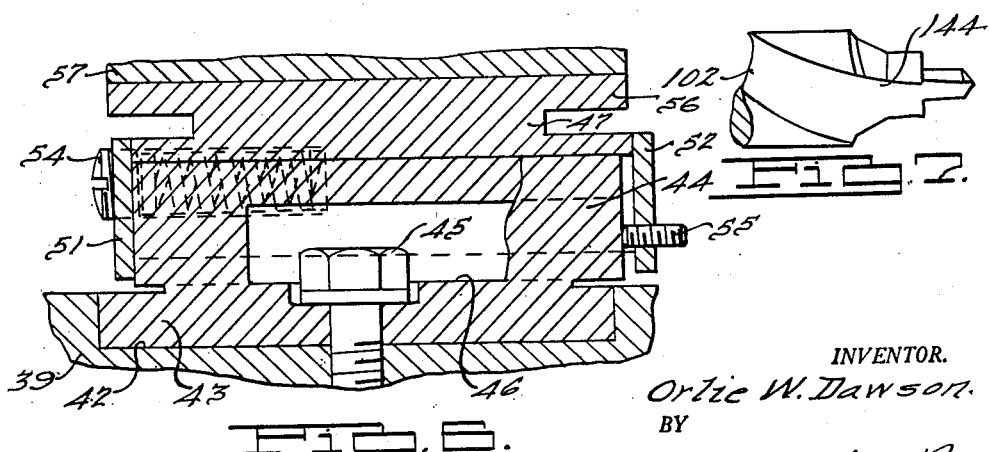
INVENTOR.
Ortie W. Dawson.
BY
Harness, Dickey & Pierce
ATTORNEYS.

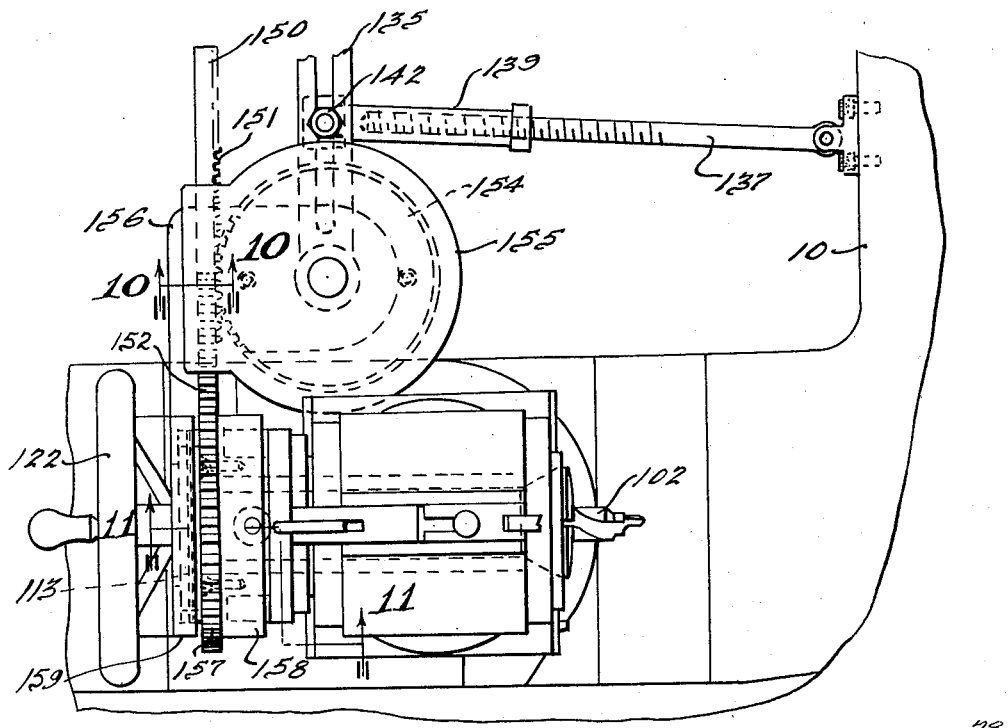
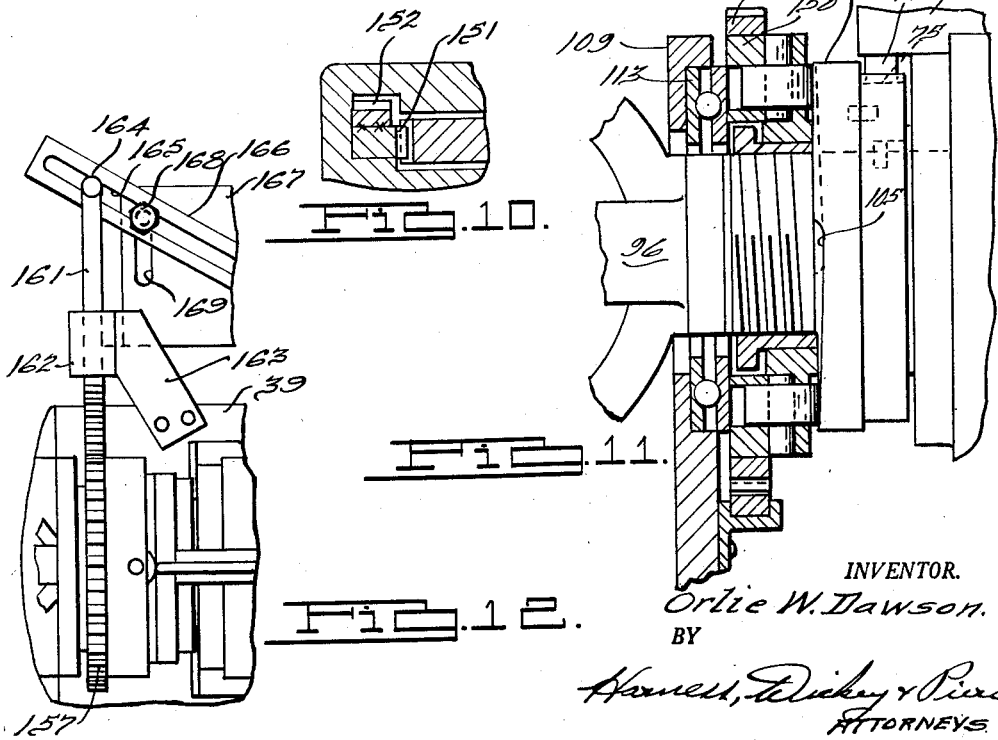

United States Patent Office 2,911,770
Patented Nov. 10, 1959

2,911,770

FIXTURE FOR POSITIONING TOOL RELATIVE TO GRINDING HEAD

Orlie Watson Dawson, Ferndale, Mich., assignor to M-W Sales, a partnership of Michigan composed of Henry W. Mouw, Garrett H. Mouw, Wendell G. Mouw, and Robert J. Walls, all of Bloomfield Township, Oakland County, Mich.

Application March 22, 1955, Serial No. 495,873

13 Claims. (Cl. 51—219)

This invention relates to tool supporting heads, and particularly to a head which supports a tool in relation to a grinding wheel or other work performing element for producing a predetermined movement of the tool relative thereto.

The invention pertains to a head similar to that described and claimed in the patent to Orlie W. Dawson, No. 2,413,436, issued on December 31, 1946. In this patent, a head is disclosed for supporting a tool for oscillation toward and away from a grinding wheel both radially and angularly of the axis of the tool. The head is provided with a cam against which a roller operates for producing the oscillation of the head in accordance with the number of cutting edges on the tool and the amount of relief to be provided thereto which corresponds to the number of cam surfaces on the cam. An angularly adjustable base plate supports the head on a movable table, the base plate having a trunnion thereon on which the head is angularly adjusted. By angularly adjusting the base plate and returning the head angularly to position the tool relative to the wheel, a forward and lateral tilting of the head occurs as the cam is rotated while engaged by the roller. In the copending application of Orlie W. Dawson, Serial No. 333,888, filed January 29, 1953, which issued as Patent No. 2,764,855, dated October 2, 1956, a further form of supporting head is illustrated, described and claimed, that wherein a longitudinal movement of the tool is produced by the particular support for the head.

The present application embodies a construction which supports a tool for movement longitudinally relative to a grinding wheel or other work performing element which produces the rotation of the tool in timed relation to the longitudinal movement so that a spiral edge may be advanced across the wheel or element. The head for supporting the tool is so constructed that the tool may have a lateral component of movement which is useful for relieving the edge as the advancement occurs. The head is mounted on a machine by which it may be moved to advance the tool axially, with mechanism interconnected between the machine bed and head which rotates the tool in timed relation with the advancing movement. Superimposed upon this movement is a further advancing movement provided by a cam which moves the entire head and tool along a line at an angle to the movement on the tool axis. Due to the angular position of the carriage, the latter movement causes the tool to move toward the wheel or element, to thereby produce a relief to the spiral edge which is being ground while maintaining the edge on a fixed diameter.

Accordingly, the main objects of the invention are: to provide a tool supporting head which is capable of producing an axial movement of a supported tool relative to a grinding wheel or other work performing element; to provide a tool supporting head with an angularly adjusted carriage on which the head may be advanced so as to superimpose a lateral component of movement to the forward movement which rotates a tool in timed relation to its advancement; to provide a head for moving a tool past a work element and rotating the tool in timed relation therewith, with cam means for shifting the head and tool during the time of advancement which introduces a lateral component of movement on the axial movement, and, in general, to provide a tool supporting head which is simple in construction and which positively controls the movement of the cutting edge relative to a work supporting element.

Other objects and features of novelty of the invention will be specifically pointed out or will become apparent when referring, for a better understanding of the invention, to the following description, taken in conjunction with the accompanying drawings, wherein:

Figure 1 is a perspective view of the grinding machine having a head thereon, embodying features of the present invention;

Fig. 2 is a broken plan view of the structure illustrated in Fig. 1;

Fig. 3 is an enlarged sectional view of the structure illustrated in Fig. 2, taken on the line 3—3 thereof;

Fig. 4 is a sectional view of the structure illustrated in Fig. 3, taken on the line 4—4 thereof;

Fig. 5 is an enlarged sectional view of the structure illustrated in Fig. 1, taken on the line 5—5 thereof;

Fig. 6 is a view of structure, similar to that illustrated in Fig. 3, with the movable table shown in locked position;

Fig. 7 is an enlarged broken view of the tool illustrating the type of cutting edge which may be sharpened and relieved advantageously by the head of the present invention;

Fig. 8 is a sectional view of the structure illustrated in Fig. 3, taken along the line 8—8 thereof;

Fig. 9 is a view of structure, similar to that illustrated in Fig. 2, showing a further form which the invention may assume;

Fig. 10 is an enlarged sectional view of the structure illustrated in Fig. 9, taken on the line 10—10 thereof.

Fig. 11 is an enlarged sectional view of the structure illustrated in Fig. 9, taken on the line 11—11 thereof; and Fig. 12 is a broken view of structure, similar to that illustrated in Fig. 9, showing still another form which the invention may assume.

Referring to Fig. 1, the base 10 of the machine may be mounted on a bench or upon a pedestal 11 and is provided with ways upon which the main platen 12 is reciprocated. An operating handle 13 extends from the side of the base 10 and is connected to the platen by a rack and pinion (not illustrated) in such manner that the platen is moved along the ways by the manipulation of the handle 13. The base 10 supports a dove-tailed element 14 upon which a platen 15 is mounted for movement between a forward and rearward supporting position. A handwheel 18 operates a lead screw in threaded relation with a nut (not shown) on the platen 15 for adjusting it between the two positions. The platen 15 has a motor riser frame 21 supported on a base 22 which is rotatably adjusted upon the platen. The frame 21 supports a lead screw 23 which is operated by a handwheel 24. The motor 26 is supported on a carriage 25 which is adjustable on the riser frame 21 by the lead screw 23. The extending shafts at the end of the motor 26 support grinding wheels 27 which are protected by guards 28 mounted on the motor.

The platen 12 has a subbase 30 secured thereto by bolts 31 and provided with a pair of bosses 32, one at each side thereof. Studs 33 project through the bosses 32 and have their ends extending into apertures in the side of a base 34 of a fixture which pivots on the stud to tilt upwardly. A pair of pivotal links 35 has studs 36 extending through slots 37 and into the base 34 for the purpose of clamping the base 34 in a horizontal or in an angular position. The fixture 38 embodying the present invention is mounted on a block 39 secured by brackets 41 to the base plate 34. A cylindrical recess 42 is provided in the base block 39 in which a cylindrical base 43 of a carriage block 44 is mounted for angular adjustment, being supported and clamped therein by a bolt 45 which is threaded into the base block 39. A slot 46 in the block 44 forms an access opening for a tool which engages the head of the bolt 45 and rotates it to locked or unlocked position.

The carriage block 44 has a carriage 47 mounted thereon, the carriage being connected thereto by the row of ball bearings 48 mounted in ways 49 in the carriage block and carriage, as clearly illustrated in Fig. 8. The ends of the carriage extend beyond the block and are connected by end plates 51 and 52. A pair of springs 53 is mounted in apertures in the carriage and block, being adjusted in tension by threaded screws 54 in the end plate 51 which are disposed in alignment with the springs 53. The opposite plate 52 has a setscrew 55 therein by which the carriage is shifted on the block against the tension of the springs 53 for the purpose for removing tension on other parts of the head, as will be explained hereinafter. The shifted position of the carriage on the carriage block through the adjustment of the screw 55 to remove the tension of the springs 53 from the elements supported by the carriage is clearly illustrated in Fig. 6. The carriage 47 has a circular plate 56 formed on the top thereof on which a cylindrical base portion 57 of the head 38 is mounted for angular adjustment about a central pin 58 disposed between the plate portions. Screws 59 extend through arcuate slots 61 in the plate portions 56 into threaded apertures 62 in the plate portion 57. In this manner, the screws 59 may be loosened and the two plate portions adjusted angularly relative to each other and thereafter clamped by the screws.

The base portion 57 supports a head 63, having an aperture 64 for supporting a pair of spaced roller and thrust bearings 65. A collet sleeve 66 is supported by the bearings for rotation therein. It will be noted that the outer races of the bearings are separated by a sleeve 60 and that the inner races of the bearings are separated by a sleeve 67. The inner sleeve 67 spaces the inner races, and any backlash which could occur between the bearings and the collet sleeve is eliminated by the adjustment of a spanner nut 68 which clamps the inner race sleeve 67 against the shoulder of the collet sleeve 66, with the balls in contact relation with the outer races of the bearings which are spaced by the sleeve 60. In this manner, endwise motion or backlash is eliminated from the collet sleeve 66.

End rings 69 and 70 are mounted on the end faces of the head 63 by screws 72 for clamping the bearings within the aperture 64. An index ring 73 is mounted on the rear end of the sleeve 66, retained in aligned position by a dowel pin 74. A plurality of slots 75 are provided in the periphery of the ring 73 conforming to the number of cam surfaces on a cam plate 76 and the number of cutting edges on the tool. The slots 75 have tapered sides engaged by tapered sides of a finger 77 mounted on an arm 78 which is pivoted to the head by a pin 79 and urged counterclockwise by a spring 81. The finger 77 may be moved out of the slot 75 by depressing the end of the arm opposite to that supporting the finger. A cam 82 is pivoted in the arm, having a lever 83 thereon by which the cam is moved to raise the finger 77 from the slot 75 and lock it in raised position. When the finger 77 is raised, the sleeve 66 may then be rotated for the purpose of indexing a tool supported thereby.

The collet sleeve 66 has an internally threaded clamping bushing 84 slidably mounted therein and retained against rotation by a screw 85 having an end 86 extending into a slot 87 in the outer wall of the bushing. The forward end of the bushing has a plurality of fingers 88 formed by slots provided through the body of the bushing in the conventional manner. The fingers have outer conical surfaces 89 engaging the conical surface 91 provided in the forward end of the collet sleeve 66. A sleeve 92 is mounted within the rear end of the collet sleeve 66 having a thread 93 thereon which engages the internal thread 94 of the bushing 84. The rear end of the sleeve has a cylindrical flange 95 thereon, the rear side of which is abutted by an operating wheel 96 which is secured on the end of the sleeve 92 by a setscrew 97. When it is desired to change the cam plate 76 and the index ring 73, this is substantially simplified when the tension is removed from the plate and ring by the adjustment of the setscrew 55, removing tension from the spring 53, as illustrated in Fig. 6 and referred to hereinbefore.

A centering and locating rod 98 is mounted within the sleeve 92, having a conical recess 99 on its forward end for receiving the projecting conical end 101 of a tool 102. It is to be understood that a pointed end may be provided on the rod 98 to locate a recessed center in the tool 102 if desired. The rod 98 is clamped within a split bushing 103 by a setscrew 104 which accurately centers the rod within the sleeve 92. When longitudinal adjustment of the rod 98 is desired, the sleeve 92 is rotated in a reverse direction to unscrew the threaded end 93 from the bushing so that the sleeve may be withdrawn and the setscrew 104 released and adjustment made, after which the screw 104 will clamp the rod in adjusted position and the sleeve 92 may again be assembled within the sleeve 66 threaded to the bushing 84.

The cam plate 76 is disposed in abutted relation to the index plate 73 having the cam surfaces 105 located relative to the slots 75 therein by a dowel pin 106. A spanner nut 107, threaded on the end of the sleeve 66, secures the cam plate 76 and the index ring 73 in fixed position on the sleeve 66. A rotatable ring 108 is mounted on a standard 109 which is welded or otherwise secured to the bracket 41. The ring is mounted for rotation on the shoulder of the nut 107 locked against a thrust bearing 113 recessed in an aperture in the standard 109, for the purpose of having a pair of rollers 112 carried by the ring engage the cam surfaces 105 of the cam plate 76. The rear face of the cam is undulated and formed in a vertical plane so that a line contact always occurs with the face of the rollers 112 in all relative positions of engagement of the face and rollers.

Grooves 114 are provided on the periphery of the ring 108, having a plurality of turns of a cable 115 thereabout, the center turn being locked to the ring by the clamping finger 116 secured to the ring by a screw 117. The two branches of the cable 115 pass over pulleys 118 mounted at the sides of the standard 109 on brackets 119, secured thereto by screws 121. The cables cross each other on the opposite side of the standard, and extend within the groove 123 in a pulley wheel 124, the ends being secured at the opposite side 125 of the pulley periphery. The pulley has a stub shaft 126 which extends into an elongated aperture 127 in a bracket 128 which is secured by screws 129 to the standard 109. A concave block 131 engages the stub shaft and is urged toward the shaft by a spring 132 tensioned by an adjustable stud 133 in a block 134 mounted on the bracket 128. A slotted arm 135 is secured about the stub shaft 126 and is secured to the pulley 124 by a pin 136. When the arm is moved angularly about the stub shaft 126, the pulley 124 is rotated to thereby rotate the ring 108.

An eyebolt 137 is pivoted to a bracket 138 on the base 10 of the machine, having a threaded sleeve 139 adjustably mounted thereon and clamped in adjusted position by a nut 141. The end of the sleeve is provided with a shouldered pin 142 which extends through the slot 143 in the arm 135 in clamped pivoted relation thereto to thereby produce the angular movement of the arm as the workpiece is advanced across the face of the grinding wheel 27 which rotates the spindle in timed relation to its advancement and also operates the roller 112 relative to the cam plate 76. Thus, it will be noted that the head 38 is provided with means for rotating the collet and tool in timed relation to the advancement of the tool across the face of the work performing element and for introducing during such advancement and rotation a movement toward the grinding wheel to provide relief to the cutting edge.

It will be noted that the table reciprocating lever 13 and the work adjusting wheel 122 are moved independently of each other. With this relationship, the tool to be dressed is secured in the collet in predetermined relation to the cam plate 76, all of which may be turned as a unit by the wheel 122. In this manner, the tool may be advanced to the grinding wheel 27 and accurately located relative thereto prior to the advancement of the table 12 across the tool which superimposes the forward and lateral movement to the tool by the rotation of the plate 108 having the rollers 112 thereon which engage the cam surfaces of the cam plate 76. To produce the relieving of the edge during the grinding operation, the carriage for the head may be adjusted angularly by the relative angular adjustment of the plate portions 56 and 57 and the angular adjustment in the reverse direction of the plate 43 in the recess 42. With such an adjustment, a lateral component of movement is introduced to the advancing movement of the tool 102 by the additional movement on the angularly disposed carriage block 44. The grinding wheel may be set so as to have an angular relationship with the axis of the tool so that the spiral cutting edge of the tool will have the same diameter as that dressed upon initial contact with the wheel. The surface of the tool in rear of the edge will be relieved a desired amount as the tool is advanced across the face of the workpiece. With this arrangement, a helical cutting edge of a tool may be accurately dressed to predetermined diameter and relieved in the same operation.

In Fig. 9 a further form of the invention is illustrated, that wherein the pulley 124 and cable 115 are eliminated by the use of a double rack bar 150 the inner face of which is provided with teeth 151, the top face of which is provided with teeth 152. The teeth 152 engage the teeth of a wheel 154 mounted within a casing 155 fixed to the standard 109 by a bracket 156. The teeth 152 engage the teeth of a ring 157 which is secured to a ring 158 substituted for the ring 108 of Fig. 3. In this arrangement, a roller thrust bearing 159 supports the ring 157 and backs up the ring 158, thereby eliminating the rollers 113. The arm 135 is secured to the gear 154 to cause it to rotate due to the connection with the pin 142, sleeve 139 and stud 137 attached to the base 10 of the machine. When the rack bar 150 is actuated, the ring 158 shifts the cam engaging rollers 112 carried thereby in the same manner as the ring 108 above referred to.

A further form of actuating means is illustrated in Fig. 12 wherein the ring gear 157 is connected to a rack bar 161 supported in a sleeve 162 from the base block 39 by a bracket 163. The end of the bar 161 has a roller 164 operating in a slot 165 in an angularly adjustable arm 166 on a plate 167. One end of the slotted arm 166 is pivoted to the base, the opposite end being secured in adjusted position by a bolt 168 which is adjustable in a slot 169 in the plate 167. The longitudinal movement of the table 12 produces the advancing and retracting movement of the bar 161 and thereby the rotation of the ring 158 to shift the cam engaging roller 112, as above described.

It is to be understood that in any of the various actuating mechanisms herein illustrated for producing the shifting of the roller 112 in synchronism with the advancement of the tool, the degree of rotation of the tool per unit length of advancing motion is changed through the adjustment of the arm to provide a greater or less advancing movement to the rack. Such adjustment is made to have the rotation of the tool conform to the lead of the helix angle of the tool cutting edge. By setting off the angular position of the carriage 47 relative to the longitudinal axis of the head, the amount of lateral component of movement is regulated to produce the desired degree of relief to the spiral cutting edge. By setting off the angular face of the grinding wheel 27 through the adjustment of the base 10, the desired diameter across the cutting edge may thereby be obtained while a relief is provided rearwardly thereof during the advancing movement of the tool across the face of the grinding wheel. Thus, the device not only produces end motion but also combined end motion and diametrical relief.

To aid in setting the tool in the collet, a finger 171 is pivoted on a block 172 which is adjustably secured on the head 63 by a screw 173. The finger accurately locates one of the flutes and cutting edges relative to the grinding wheel and to the slotted plate 73 and cam plate 76. After one of the spiral cutting edges has been sharpened and relieved through the withdrawal of the plunger 77 and the rotation of the plate 73 to the next adjacent or proper slot 75 in the index plate, the next adjacent cutting edge is rotated into position of engagement with the grinding wheel 27 and this adjustment is continued until all of the cutting edges have been moved to a position for presenting the cutting edge to the wheel. When two spiral cutting edges are provided to the tool, then the index ring 73 is rotated through 180° before it is again clamped by the plunger 77. Such rotation brings the second cutting edge in position to be sharpened and relieved.

It is to be understood that the screw 55 may be employed to shift the carriage 47 on the block 44 which shifts the head 63 and tool 102 so that the edge to be ground will be properly presented to the work. This eliminates making any other change in the tool and head setup and provides a simple adjustment for changing the position of the cutting edge relative to the wheel. After the tool is secured in the head, the grinding wheel is adjusted relative to the helical cutting edge through the operation of a hand wheel 18. Thereafter, the hand wheel 122 is rotated, causing the head to advance and move toward the wheel to thereby grind the cutting edge and relieve the cutting edge due to the forward and lateral advancement of the head. While the wheel 22 is rotated in this manner, the lever 13 is advanced to move the tool along the edge of the grinding wheel, which advancement causes the ring 108 carrying the rollers 112 to rotate to progressively change the position of engagement of the cam surfaces 105, following the lead of the helical cutting edge, which thereby causes the cutting edge to be sharpened and relieved as the tool is advanced across the edge of the grinding wheel through the operation of the lever 13. In this manner, helical edges are ground to a proper diameter and are simultaneously relieved a desired amount depending upon the angularity of the carriage 47 relative to the head 63.

What is claimed is:

1. A head for supporting and adjusting a tool relative to a work performing element, said head having a base, a longitudinally shiftable carriage supporting said base, a shiftable table supporting said carriage said carriage being angularly adjusted on said table relative to said head for introducing a lateral component of movement to the longitudinal movement of the head, means for supporting a tool in said head, cam means on said head, means engaging said cam means for moving said head and carriage longitudinally, means for rotating said tool supporting means for causing said cam means to advance said head and carriage on said table, and means for shifting the position of said cam engaging means in timed relation to the movement of said table.

2. A head for supporting and adjusting a tool relative to a work performing element, said head having a base, a longitudinally movable support for said base, a reciprocable table on which said support is mounted for longitudinal movement and angular adjustment, means for supporting a tool in said head, means for rotating said tool supporting means, a cam plate carried by said head having a cam surface on its outer side, and means engaging said cam surface for shifting said support and head on said table when the tool and cam surface are rotated.

3. A head for supporting and adjusting a tool relative to a work performing element, said head having a base, a longitudinally movable support for said base, a reciprocable table on which said support is mounted for longitudinal movement and angular adjustment, means for supporting a tool in said head, means for rotating said tool supporting means, a cam plate carried by said head having a cam surface on its outer side, means engaging said cam surface for shifting said support and head on said table when the tool and cam surface are rotated, and means for shifting said cam surface engaging means in timed relation to the movement of said table.

4. A head for supporting and adjusting a tool relative to a work performing element, said head having a base, a longitudinally movable carriage supporting said base, a support for said carriage, said carriage being angularly adjusted relative to said head and support to permit the tool axis to be disposed at an angle to the direction of movement of the carriage, means for supporting a tool in said head, means for rotating said tool, cam means on said head having an end cam face means engaging the end cam face of said cam means for moving said head and carriage longitudinally, a reciprocable table carrying said carriage support, and means connected to said table for shifting said cam engaging means in timed relation to the advancement of the table.

5. A head for supporting and adjusting a tool relative to a work performing element, said head having a base, a longitudinally shiftable carriage supporting said base, said carriage being angularly adjusted relative to said head for introducing a lateral component of movement to the longitudinal movement of the head, means for supporting a tool in said head, means for rotating said tool, an index ring on said head, a cam plate abutting said ring and accurately located relative thereto, said cam plate having a camming surface on one face thereof, and a rotatable ring having rolling means thereon in line engagement with said camming surface which shifts said head and carriage longitudinally when said cam plate is rotated.

6. A head for supporting and adjusting a tool relative to a work performing element, said head having a base, a longitudinally shiftable carriage supporting said base, said carriage being angularly adjusted relative to said head for introducing a lateral component of movement to the longitudinal movement of the head, means for supporting a tool in said head, means for rotating said tool, an index ring on said head, a cam plate abutting said ring and accurately located relative thereto, said cam plate having a camming surface on the face thereof remote from said index ring, a rotatable ring having rolling means thereon in line engagement with said camming surface which shifts said head and carriage longitudinally when said cam plate is rotated, and means for rotating said rotatable ring.

7. A head for supporting and adjusting a tool relative to a work performing element, said head having a base, a longitudinally shiftable carriage supporting said base, a table supporting said carriage, said carriage being angularly adjusted relative to said head and table for introducing a lateral component of movement to the longitudinal movement of the head, means for supporting a tool in said head, means for rotating said tool, an index ring on said head, a cam plate abutting said ring and accurately located relative thereto, said cam plate having a camming surface on the face thereof remote from said index ring, a rotatable ring having rolling means thereon in line engagement with said camming surface which shifts said head and carriage longitudinally when said cam plate is rotated, means for rotating said rotatable ring, said rotating means including a cable wound around said ring, a pulley about which the cable is operably secured, an arm on said pulley, and means engaging said arm and rotating said pulley for moving said cable and rotating said ring in timed relation to the movement of said table.

8. A head for supporting and adjusting a tool relative to a work performing element, said head having a base, a longitudinally movable carriage supporting said base, a table supporting said carriage, said carriage being angularly adjusted relative to said head and table for introducing a lateral component of movement to the longitudinal movement of the head, means for supporting a tool in said head, means for rotating said tool, an index ring on said head, a cam plate abutting said ring and accurately located relative thereto, said cam plate having a camming surface on the face thereof remote from said index plate, a rotatable ring having rolling means thereon in line engagement with said camming surface which shifts said head and carriage longitudinally when said cam plate is rotated, teeth on said ring, a rack bar having teeth engaging the teeth of said ring, and an adjustable arm engaging the end of the rack bar for causing it to move longitudinally to rotate said ring in timed relation to the movement of said table.

9. A head for supporting and adjusting a tool relative to a work performing element, said head having a base, a longitudinally shiftable carriage supporting said base, a table supporting said carriage, said carriage being angularly adjusted relative to said head and table for introducing a lateral component of movement to the longitudinal movement of the head, means for supporting a tool in said head, means for rotating said tool, an index ring on said head, a cam plate abutting said ring and accurately located relative thereto, said cam plate having a camming surface on the face thereof remote from said index plate, a rotatable ring having rolling means thereon engaging said camming surface, teeth on said ring, a rack bar having teeth engaging the teeth of said ring, a second rack bar on said first rack bar, a gear engaging the teeth of said second rack bar, an arm fixed to said gear, and means engaging said arm to cause the arm to move angularly and rotate said gear and rotatable ring when the table is moved.

10. A head for supporting and adjusting a tool relative to a work performing element, a carriage on which said head is supported, a base, rolling means for supporting said carriage on said base for movement longitudinally of its length, spring means urging said carriage forwardly on said base, and means for shifting said carriage on said base to a solid stop position which renders said spring means ineffective without the necessity of compressing it to a solid state.

11. A head for supporting and adjusting a tool relative to a work performing element, means on said head for supporting a tool, indexing means for locating said tool in said head, cam means for adjusting said head longitudinally, a base, an angularly adjustable element on said base, a carriage on said angularly adjustable element shiftable longitudinally thereon, spring means between said angularly adjustable element and said carriage for urging the carriage in one direction, a plate on said carriage, and a plate on said head, said plates being angularly adjustable relative to each other so as to permit said carriage and said first angularly adjustable element to be shifted relative to said head while permitting said head and carriage to be moved longitudinally by said cam means.

12. A head for supporting and adjusting a tool relative to a work performing element, means on said head for supporting a tool, indexing means for locating said tool in said head, cam means for adjusting said head longitudinally, a base, an angularly adjustable element on said base, a carriage on said angularly adjustable element shiftable longitudinally thereon, spring means between said angularly adjustable element and said carriage for urging the carriage in one direction, a plate on said carriage, a plate on said head, said plates being angularly adjustable relative to each other so as to permit said carriage and said first angularly adjustable element to be shifted relative to said head while permitting said head and carriage to be moved longitudinally by said cam means, and means on said carriage for regulating the tension of said spring means.

13. A head for supporting and adjusting a tool relative to a work performing element, means on said head for supporting a tool, indexing means for locating said tool in said head, cam means for adjusting said head longitudinally, a base, an angularly adjustable element on said base, a carriage on said angularly adjustable element shiftable longitudinally thereon, spring means between said angularly adjustable element and said carriage for urging the carriage in one direction, a plate on said carriage, a plate on said head, said plates being angularly adjustable relative to each other so as to permit said carriage and said first angularly adjustable element to be shifted relative to said head while permitting said head and carriage to be moved longitudinally by said cam means, means on said carriage for regulating the tension of said spring means, and means on said carriage for rendering said spring means ineffective and locking said carriage to said angularly adjustable element.

References Cited in the file of this patent

UNITED STATES PATENTS

| | | |
|---|---|---|
| 850,374 | King | Apr. 16, 1907 |
| 1,136,891 | Candee | Apr. 20, 1915 |
| 1,323,452 | Cogsdill | Dec. 2, 1919 |
| 1,703,017 | Singer | Feb. 19, 1929 |
| 1,906,877 | Trotter | May 2, 1933 |
| 1,993,418 | Smyser | Mar. 5, 1935 |
| 2,069,140 | Freas et al. | Jan. 26, 1937 |
| 2,387,440 | Guellich et al. | Oct. 23, 1945 |
| 2,389,401 | Andreasson | Nov. 20, 1945 |
| 2,413,436 | Dawson | Dec. 31, 1946 |
| 2,434,753 | Andreasson | Jan. 20, 1948 |
| 2,445,194 | Umbdenstock | July 13, 1948 |
| 2,572,015 | Devanny | Oct. 23, 1951 |
| 2,583,363 | Durland | Jan. 22, 1952 |